Feb. 20, 1962 B. STRONG 3,021,559
METHOD OF AND APPARATUS FOR THE MANUFACTURE
OF HOLLOW PLASTIC ARTICLES
Filed July 27, 1959

Inventor
*Bernard Strong*
By
*Holcomb, Wetherill & Brisebois*
Attorneys

United States Patent Office 3,021,559
Patented Feb. 20, 1962

3,021,559
METHOD OF AND APPARATUS FOR THE MANUFACTURE OF HOLLOW PLASTIC ARTICLES
Bernard Strong, Northwood Hills, England, assignor to E. Shipton & Company Limited, Northwood Hills, England, a British company
Filed July 27, 1959, Ser. No. 829,832
Claims priority, application Great Britain July 31, 1958
8 Claims. (Cl. 18—5)

The present invention relates to the manufacture of hollow plastic articles by the process of expanding an extruded length of plastic tube into conformity with a surrounding mould cavity by admitting compressed air into the tube, and has for its object to provide a method of sealing the article whilst air pressure is still applied to the interior thereof so that the finished hollow article will have air or compressed air entrapped therein.

The conventional method of manufacturing blown hollow articles, for example polythene bottles, consists in extruding the required length of plastic tubing through an annular nozzle, closing a mould around the extruded length of tube, and admitting compressed air into the length of tube enclosed by the mould to inflate the tube to conform with the shape of the mould cavity. The compressed air may be admitted into the length of tube through a bore in the core piece of the annular nozzle or through a nozzle inserted into the lower end of the extruded length of tube. After the blown article has rigidified within the mould, the air pressure is removed, the mould is opened, and the article ejected.

According to this invention, the method of manufacturing blown hollow plastic articles which are completely sealed, consists in extruding a length of plastic tubing through an annular nozzle, closing a mould around the extruded length of tubing, admitting compressed air into the interior of the length of tube enclosed by the mould through a hollow needle of small diameter whereby to inflate the tube to conform with the shape of the mould cavity, and injecting extra plastic material around the small diameter needle so that the air pressure within the article causes this extra plastic to seal over and close the small diameter hole in the wall of the article when the small diameter needle is withdrawn.

Figure 1:
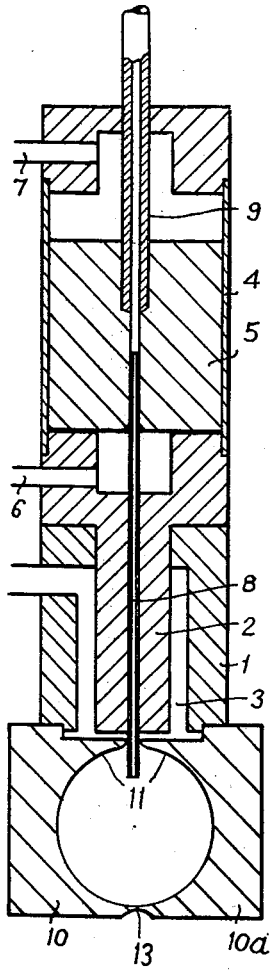
Figure 3:
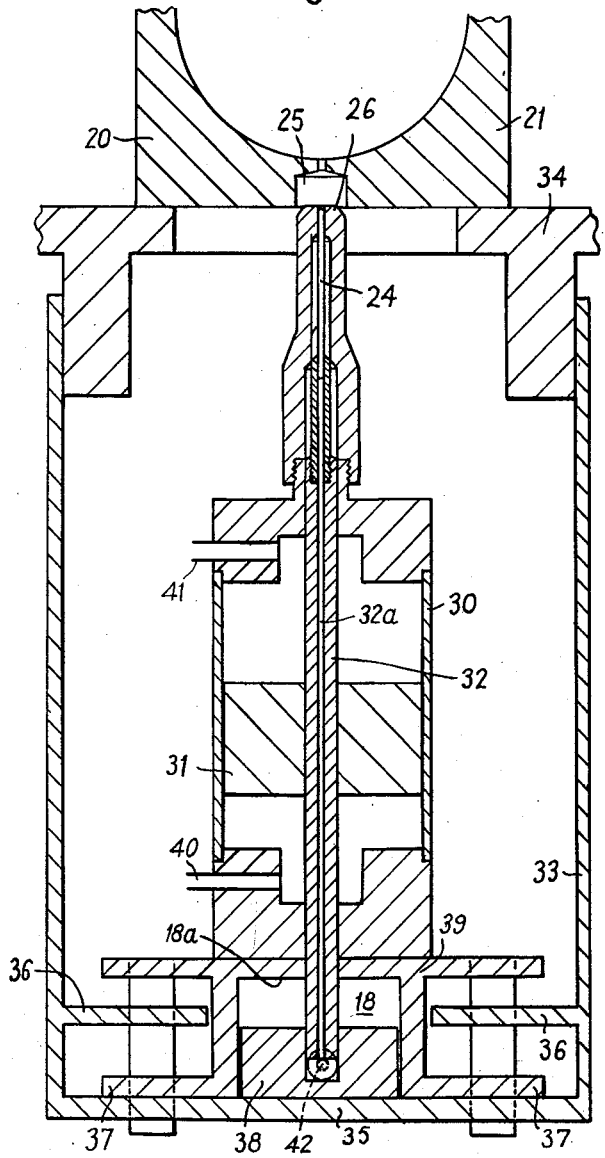
Figure 2:
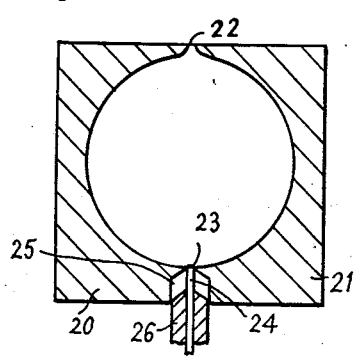

In order that the invention may be more clearly understood, reference will now be made to the accompanying drawing, in which:

FIGURE 1 shows diagrammatically a cross-section through a nozzle and mould arrangement according to one embodiment of the invention, FIGURE 2 shows diagrammatically a section of an alternative embodiment, FIGURE 3 shows diagrammatically a section of a third embodiment, FIGURE 1 shows an apparatus for carrying out the method of this invention in which blowing air is admitted into the extruded length of tube through the bore of the core piece of the annular extrusion nozzle. With this embodiment the method is carried out by extruding a length of plastic tube such as polythene, through a nozzle 1 having a central core 2 to define an annular nozzle passage 3 through which the tube is extruded. Mounted on top of the nozzle is a double-acting air cylinder 4 containing a piston 5, up and down movement of which can be effected by admitting compressed air either to the bottom end of the cylinder through the passage 6 or to the upper end of the cylinder through the passage 7. The piston carries a small diameter hollow needle 8 which extends through a bore in the core piece 2 and, when the piston 5 is in its lowest position, projects slightly below the bottom end of the core piece 2. Air is fed to the needle through a tube 9 slidable with the piston and extending through sealing means (not shown) in the top end plate of the cylinder 4. 10, 10a are the two parts of a mould which can be closed around the lower end of the nozzle in known manner. The mould cavity is shaped as a sphere to form a plastic ball.

The method of the invention is carried out with the apparatus described in the following manner:

With the mould parts open, a tube of plastic is extruded through the annular nozzle passage 3. When the required length of tube is extruded, extrusion is stopped and the mould parts closed around the nozzle 1. At this time the piston 5 is in its lowermost position with the needle 8 projecting below the bottom of the core piece 2 so that when the mould parts close, the cutting edges 11 at the top of the mould will lie close around the needle 8 but slightly spaced therefrom. The lands 13 at the bottom of the mould pinch the lower end of the extruded tube to close it.

Air is then admitted through the pipe 9 and needle 8 to inflate the plastic tube enclosed within the mould into conformity with the mould cavity. Extrusion is then again effected momentarily. The mould and the cutters 11 are made in such a way that there is a slight clearance so that during this momentary further extrusion a little extra plastic is injected into the mould and forms a kind of small slug extending around and beyond the end of the needle 8. Air pressure to the needle 8 is then turned off and air is admitted to the bottom end of the cylinder 4 to raise the needle 8, whereupon the air within the blown hollow article tends to push a part of this plastic slug over the hole in the article and back up the bore in the needle, thus completely sealing the blown hollow article.

In another embodiment of the invention, the length of extruded plastic tube is pinched between the two ends of the mould parts as the latter are closed therearound and the article is blown by a small diameter nozzle inserted through the bottom of the mould. This is illustrated in FIGURE 2, in which 20 and 21 are the mould parts of which the top lands 22 pinch the extruded tube adjacent the extrusion nozzle and the bottom lands 23 pinch the tube around a nozzle formed by a hollow needle 24, the bottom lands 23 being provided with spaces to permit the needle to extend therethrough. Just below the bottom lands, the mould parts are formed with recesses 25 which when the mould parts are closed together form a cylindrical cavity adapted to receive a plunger constituted by the nozzle holder part 26. After the hollow article has been blown by admitting air through the needle 24, the plunger 26 is raised and injects into the mold, through the clearances around the needle 24, a quantity of the plastic which is positioned in the cavity 25 after pinching the plastic tube when the mould is closed. This additional quantity of plastic forms a slug around the needle so that when the needle is withdrawn the plastic of the slug will be forced by the air pressure in the hollow article to close the aperture through which the needle is withdrawn.

FIGURE 3 shows a modification of FIGURE 2 in which the needle 24 is slidable within the plunger 26 and is actuated in a manner such that the needle and plunger move simultaneously in opposite directions so that the needle is withdrawn as the plunger is moved to inject a small quantity of plastic to close the hole through which the needle was inserted.

This is effected by means of the double-acting air cylinder 30, on the casing of which is mounted the plunger part 26. The piston 31 within the cylinder is mounted on a hollow piston rod 32 which carries the needle 24 by means of the tubular connecting piece 19. The cylinder is mounted in a frame 33 carried from the underside of the machine bed 34 on which the mould 20, 21 is mounted. The frame 33 has a base portion 35 and inwardly projecting arms 36 which are located respectively below and above arms 37 on a part 39 carried by the bottom of the cylinder 30 to limit the up and down movement of the cylinder and hence of the plunger part 26. The lower end of the piston rod 32 is connected with a block 38 which is movable in a cavity 18 in the part 39 between the base 35 and the upper surface 18a of the cavity 18 to limit the movement of the block 38 and thus also of the needle 24.

The plastic tube, is extruded through an annular nozzle (not shown) located directly above the needle 24. Air is admitted to the lower end of the cylinder 30 through the passage 40 whereby the piston 31 and needle 24 are raised and the cylinder 30 is moved to its lowermost position with the arms 37 resting against the base 35. The needle 24 is then in its raised position with the block 38 bearing against the upper surface 18a of the cavity 18. When the extruded plastic tube passes over the nozzle, extrusion is stopped and the mould is closed. Air is admitted through the passage 42 in block 38 and through the bore 32a in the piston rod 32 to the needle 24 to blow the hollow article. The air supply to the cylinder 30 is reversed by admitting air through passage 41 and connecting passage 40 to exhaust, which causes the piston 31 to move downwards until the block 35 engages the base 35, thereby causing the needle 24 to be withdrawn. The air pressure simultaneously causes the cylinder 30 and plunger 26 to move upwards, the plunger 26 injecting a quantity of the plastic material in the cavity 25 at the base of the mould into the hollow article to close the opening through which the needle 24 has been withdrawn.

When the article is cooled and rigidified, the mould is opened, and the completely sealed ball removed. The cycle of operations is then repeated.

I claim:

1. The method of manufacturing blown hollow plastic articles which are completely sealed, which consists in extruding a length of plastic tubing through an annular noozle, closing a mould around the extruded length of tubing, admitting compressed air into the interior of the length of tube enclosed by the mould through a hollow needle of small diameter whereby to inflate the tube to conform with the shape of the mould cavity, and injecting extra plastic material around the small diameter needle so that the air pressure within the article causes this extra plastic to seal over and close the small diameter hole in the wall of the article when the small diameter needle is withdrawn.

2. A method of manufacturing blown hollow plastic articles which are completely sealed comprising the steps of extruding a length of plastic tubing through an annular nozzle, closing a mould around the extruded length of tubing, admitting compressed air into the interior of the length of tube enclosed by the mould through a hollow needle of small diameter whereby to inflate the tube to conform with the shape of the mould cavity, and injecting a small amount of plastic material retained in a cylindrical cavity in the wall of the mould and surrounding the needle into the mould cavity around said needle by moving a plunger into said cylindrical cavity, the air pressure within the article causing this extra plastic to seal over and close the small diameter hole in the wall of the article when the needle is withdrawn.

3. A method of manufacturing blown hollow plastic articles which are completely sealed comprising the steps of extruding a length of plastic tubing through an annular nozzle, closing a mould around the extruded length of tubing, admitting compressed air into the interior of the length of tube enclosed by the mould through a hollow needle of small diameter whereby to inflate the tube to conform with the shape of the mould cavity, and injecting extra plastic material around the small diameter needle substantially simultaneously as said needle is with drawn from the mould cavity whereby to seal the small diameter hole in the wall of the article when said needle is withdrawn.

4. Apparatus for manufacturing completely sealed blown hollow plastic articles comprising means for extruding a tube of plastic material, mould parts which when closed together define a mould cavity, means for closing said mould parts around the extruded tube of plastic, a hollow needle of small diameter adapted to fit within the enclosed tube of plastic, means supplying blowing fluid to said needle to expand said tube to conform to the mould cavity, means for injecting extra plastic material around said needle into said mould cavity and means for withdrawing said neelde.

5. Apparatus for manufacturing completely sealed, blown hollow plastic articles comprising means for extruding a tube of plastic material, two mould parts which when closed together define a mould cavity, means for closing said mould parts around the extruded tube of plastic and thereby to close one end of said tube, a hollow needle of small diameter, a double-acting fluid operated piston within a cylinder, said piston being connected to said needle, means for supplying fluid pressure to said cylinder to cause said needle to lie within the open end of the tube, means for supplying blowing fluid to said needle to expand the tube to conform to the mould cavity means for injecting extra plastic material around said needle into said mould cavity, and means for supplying fluid pressure to said cylinder to cause withdrawal of the needle from the mould cavity.

6. Apparatus for manufacturing completely sealed, blown hollow plastic articles comprising means for extruding a tube of plastic material, two mould parts, which when closed together define a mould cavity, means for closing said mould parts around the extruded tube of plastic and thereby to close one end of said tube, a hollow needle of small diameter adapted to fit within the other end of said tube, a plunger surrounding said needle adjacent the mould cavity, said mould parts having a cylindrical cavity around said needle for cooperation with said plunger, means for supplying blowing fluid to said needle to expand said tube to conform to the mould cavity, means for moving said plunger into the cylindrical cavity to inject plastic material retained therein around the needle into the mould cavity, and means for withdrawing said needle.

7. Apparatus for manufacturing completely sealed, blown hollow plastic articles comprising means for extruding a tube of plastic material, mould parts, which when closed together define a mould cavity, means for closing said mould parts around the extruded tube of plastic and thereby to close the end thereof adjacent the extrusion means, a small diameter nozzle adapted to fit within the end of the tube remote from the extrusion means, a plunger surrounding said nozzle adjacent the mould cavity, said mould parts having a cylindrical cavity around said nozzle for cooperation with said plunger, means for supplying blowing fluid to said nozzle to expand said tube to conform to said mould cavity, and means for substantially simultaneously moving said plunger into said cylindrical cavity and withdrawing the nozzle from said mould cavity whereby plastic material in said cylindrical cavity is injected towards the mould cavity as the nozzle is withdrawn to seal the blown article.

8. Apparatus as claimed in claim 7, comprising a table supporting said mould parts, a frame suspended from said table a double-acting fluid operated piston within a cylinder mounted on said frame to float, said plunger being connected with said cylinder, means connecting said piston to the nozzle for movement thereof, means limiting movement of said piston within the cylinder and movement of the cylinder in the frame and means for supplying fluid pressure to said cylinder whereby when the nozzle is fitted within the tube the plunger is withdrawn from said cylindrical cavity and when the nozzle is withdrawn from said tube the plunger is inserted into said cylindrical cavity.

References Cited in the file of this patent

UNITED STATES PATENTS

| | | |
|---|---|---|
| 2,750,625 | Colombo | June 19, 1956 |
| 2,890,483 | Soubier | June 16, 1959 |